(12) United States Patent
Toyooka et al.

(10) Patent No.: US 9,961,311 B2
(45) Date of Patent: May 1, 2018

(54) PROJECTOR AND CONTROL METHOD

(71) Applicant: SEIKO EPSON CORPORATION, Tokyo (JP)

(72) Inventors: Takashi Toyooka, Matsumoto (JP); Tatsuya Iguchi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days. days.

(21) Appl. No.: 15/407,635

(22) Filed: Jan. 17, 2017

(65) Prior Publication Data

US 2017/0208300 A1 Jul. 20, 2017

(30) Foreign Application Priority Data

Jan. 20, 2016 (JP) ................................. 2016-008775

(51) Int. Cl.
  *G03B 21/14* (2006.01)
  *H04N 9/31* (2006.01)
  *G02B 5/30* (2006.01)
  *G02B 27/28* (2006.01)
  *G03B 21/20* (2006.01)

(52) U.S. Cl.
  CPC ......... *H04N 9/3155* (2013.01); *G02B 5/3083* (2013.01); *G02B 27/283* (2013.01); *G03B 21/142* (2013.01); *G03B 21/204* (2013.01); *G03B 21/2073* (2013.01); *H04N 9/3105* (2013.01); *H04N 9/3158* (2013.01); *H04N 9/3161* (2013.01); *H04N 9/3167* (2013.01); *H04N 9/3182* (2013.01); *H04N 9/3194* (2013.01)

(58) Field of Classification Search
  CPC .............. G03B 21/204; G03B 21/2053; G03B 21/206; G03B 21/2033; G03B 21/2073; H04N 9/31; H04N 9/3102; H04N 9/3155; H04N 9/3158; H04N 9/3167; H04N 9/73
  See application file for complete search history.

(56) References Cited

U.S. PATENT DOCUMENTS 8,733,940 B2 * 5/2014 Tanaka .................. G03B 21/28
                                                          353/20
9,429,831 B2 * 8/2016 Akiyama ........... G03B 21/2073
(Continued)

FOREIGN PATENT DOCUMENTS

JP         2015-106130 A      6/2015

*Primary Examiner* — William C Dowling
(74) *Attorney, Agent, or Firm* — Oliff PLC (57) ABSTRACT

A projector includes a light-emitting element that outputs light of a first wavelength band which is in a first polarization state; a retardation plate that converts a portion of the light into a second polarization state; a polarization separation element that separates the light from the retardation plate into a first flux of light in the first polarization state and a second flux of light in a second polarization state; a phosphor, excited by the first flux of light, which outputs a third flux of light of a second wavelength band; a retardation plate control unit that controls a rotation angle of the retardation plate in accordance with brightness information indicating brightness of the third flux of light; and a light-emitting element control unit that controls brightness of the light-emitting element in accordance with the brightness information and temperature information indicating a temperature of the light-emitting element.

7 Claims, 8 Drawing Sheets

(56) References Cited

U.S. PATENT DOCUMENTS

| | | | |
|---|---|---|---|
| 9,500,937 B2 | 11/2016 | Tanaka | |
| 9,500,941 B2 | 11/2016 | Akiyama et al. | |
| 2010/0328611 A1* | 12/2010 | Silverstein | H04N 9/3155 353/7 |
| 2015/0009477 A1* | 1/2015 | Toyooka | G03B 21/14 353/85 |
| 2015/0153020 A1 | 6/2015 | Akiyama | |
| 2017/0208303 A1* | 7/2017 | Toyooka | H04N 9/3158 |

\* cited by examiner

PROJECTOR AND CONTROL METHOD

CROSS-REFERENCE

The entire disclosure of Japanese Patent Application No. 2016-008775, filed Jan. 20, 2016 is expressly incorporated by reference herein.

BACKGROUND

1. Technical Field

The present invention relates to a technique for controlling the rotation angle of a retardation plate in a projector.

2. Related Art

Light source devices using a solid-state light source such as a laser diode have been known. In such light source devices, light of a certain wavelength band which is output from the solid-state light source is separated by a polarization separation mirror. One beam of light separated is guided to a phosphor, as excitation light, and the phosphor emits light of a wavelength band different from that of the solid-state light source. The light which is output from the phosphor is synthesized with the other beam of light separated, and is output as light including more wavelength band components.

Such light source devices have a problem in that a white balance of light to be output shifts due to a change in the characteristics of the solid-state light source or the phosphor over time. On the other hand, for example, JP-A-2015-106130 discloses a light source device that compensates for a change in color balance associated with a change over time during its use.

In the technique disclosed in JP-A-2015-106130, a change in color due to a deterioration in a light source is measured when the brightness of a light source is set to a specific value, and a color balance is adjusted by rotating a retardation plate in accordance therewith. However, in a case where the retardation plate is controlled so as to maintain the color balance, there is a problem in that, as a result, the brightness changes.

SUMMARY

An advantage of some aspects of the invention is to provide a technique for adjusting a color balance and the brightness of a light source while considering a mutual influence.

An aspect of the invention provides a projector including: a light-emitting element that outputs light of a first wavelength band which is in a first polarization state; a retardation plate that converts a portion of the light output from the light-emitting element into a second polarization state in accordance with a rotation angle of the retardation plate; a polarization separation element that separates the light from the retardation plate into a first flux of light in the first polarization state and a second flux of light in a second polarization state; a phosphor, excited by the first flux of light, which outputs a third flux of light of a second wavelength band different from the first wavelength band; an optical modulator that modulates the light in accordance with a video signal; a retardation plate control unit that controls a rotation angle of the retardation plate in accordance with brightness information indicating brightness of the third flux of light; and a light-emitting element control unit that controls brightness of the light-emitting element in accordance with the brightness information and temperature information indicating a temperature of the light-emitting element.

According to such a projector, it is possible to control the brightness of the light-emitting element in consideration of the brightness information used to control the retardation plate.

The projector may further include a color correction unit that performs color correction in accordance with the brightness information, and the retardation plate control unit may control the rotation angle of the retardation plate in accordance with a correction result in the color correction unit.

According to such a projector, it is possible to adjust a color balance in accordance with the brightness information.

The projector may further include a brightness correction unit that corrects the brightness information in accordance with the correction result in the color correction unit, and the light-emitting element control unit may control the brightness of the light-emitting element in accordance with the brightness information corrected in the brightness correction unit and the temperature information.

According to such a projector, it is possible to correct brightness in accordance with the adjustment result of a color balance.

The brightness information may include brightness information which is set in accordance with a user's instruction input.

According to such a projector, it is possible to control the brightness of the light-emitting element in consideration of the brightness information which is set by a user's instruction input.

The light-emitting element control unit may control the brightness of the light-emitting element in accordance with the brightness information which is set depending on an analysis result of the video signal and the temperature information.

According to such a projector, it is possible to control the brightness of the light-emitting element in consideration of the brightness information which is set in accordance with the analysis result of the video signal.

The retardation plate control unit may control the rotation angle of the retardation plate in accordance with the brightness information which is set depending on an analysis result of the video signal.

According to such a projector, it is possible to adjust a color balance in consideration of the brightness information which is set in accordance with the analysis result of the video signal.

Another aspect of the invention provides a control method including: causing a light-emitting element to output light of a first wavelength band which is in a first polarization state; causing a retardation plate to convert a portion of the light output from the light-emitting element into a second polarization state in accordance with a rotation angle of the retardation plate; separating the light from the retardation plate into a first flux of light in the first polarization state and a second flux of light in a second polarization state; causing a phosphor excited by the first flux of light to output a third flux of light of a second wavelength band different from the first wavelength band; causing an optical modulator to modulate the light in accordance with a video signal; controlling a rotation angle of the retardation plate in accordance with brightness information indicating brightness of the third flux of light; and controlling brightness of the light-emitting element in accordance with the brightness information and temperature information indicating a temperature of the light-emitting element.

According to such a control method, it is possible to control the brightness of the light-emitting element in consideration of the brightness information used to control the retardation plate.

BRIEF DESCRIPTION OF THE DRAWINGS

The invention will be described with reference to the accompanying drawings, wherein like numbers reference like elements.

DESCRIPTION OF EXEMPLARY
EMBODIMENTS

1. Configuration

Figure 1:
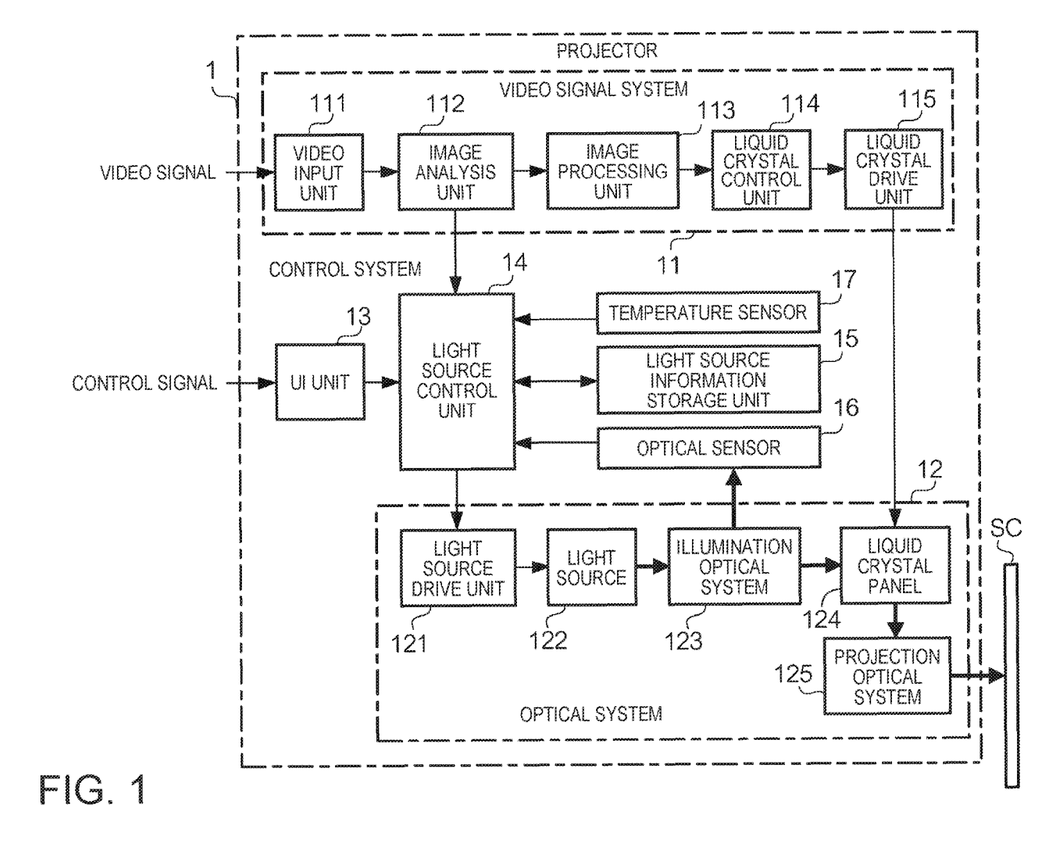
FIG. 1 is a diagram illustrating a functional configuration of a projector according to a first embodiment.

FIG. 1 is a diagram illustrating a functional configuration of a projector 1 according to a first embodiment. The projector 1 is a projector that automatically adjusts a color balance in each of a plurality of brightness settings.

The projector 1 includes a video signal system 11, an optical system 12, a UI unit 13, a light source control unit 14, a light source information storage unit 15, an optical sensor 16, and a temperature sensor 17. The video signal system 11 controls an optical modulator (liquid crystal panel 124 in this example) in accordance with a video signal having received an input. The video signal system 11 includes a video input unit 111, an image analysis unit 112, an image processing unit 113, a liquid crystal control unit 114, and a liquid crystal drive unit 115. The video input unit 111 receives an input of a video signal. The image analysis unit 112 performs an image analysis process on the video signal. In this example, the image analysis process is, for example, a process of specifying the type (movie, sports broadcast, presentation image, or the like) of video indicated by the video signal. The image processing unit 113 performs predetermined image processing (for example, size change or keystone correction) on the video signal. The liquid crystal control unit 114 generates a signal for controlling the liquid crystal panel 124 from the video signal. The liquid crystal drive unit 115 outputs a signal for driving the liquid crystal panel 124 in accordance with the signal which is output from the liquid crystal control unit 114.

The optical system 12 controls light which is projected onto a screen SC (hereinafter, referred to as "projection light"). The optical system 12 includes a light source drive unit 121, a light source 122, an illumination optical system 123, a liquid crystal panel 124, and a projection optical system 125. The light source drive unit 121 drives the light source 122. The light source 122 outputs illumination light. The illumination light refers to light which is modulated later and is changed into projection light. The illumination light is white light including a plurality of wavelength band components. The illumination optical system 123 separates the illumination light into a plurality of color components (for example, three colors of red, green, and blue). The respective beams of light separated into color components are incident on individual liquid crystal panels 124. The liquid crystal panel 124 is an example of an optical modulator that modulates the illumination light in accordance with a video signal. The projection optical system 125 synthesizes beams of light modulated for each color component, and projects the synthesized light as the projection light onto the screen SC.

Figure 2:
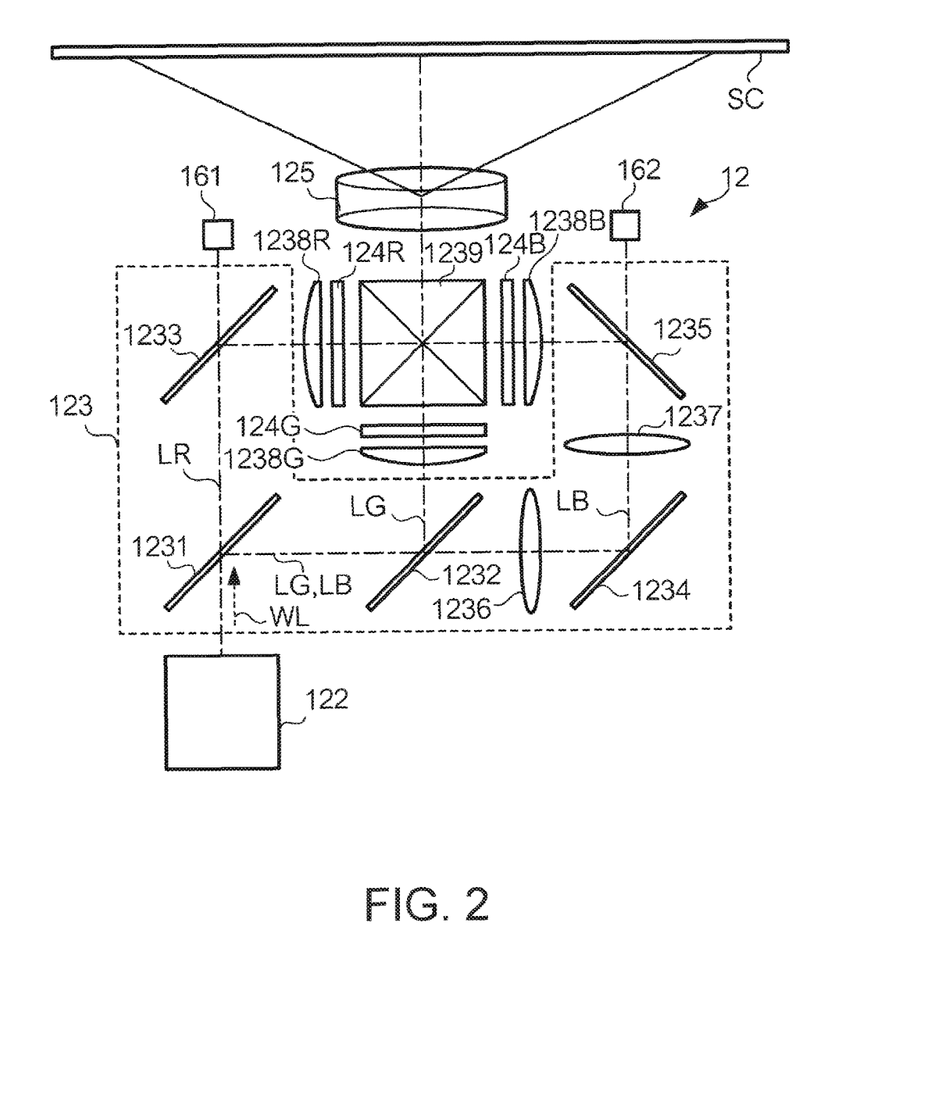
FIG. 2 is a diagram illustrating a configuration of an optical system.

FIG. 2 is a diagram illustrating a specific configuration of the optical system 12. The illumination optical system 123 includes a dichroic mirror 1231, a dichroic mirror 1232, a reflection mirror 1233, a reflection mirror 1234, a reflection mirror 1235, a relay lens 1236, and a relay lens 1237. In this example, in order to individually modulate red light LR, green light LG, and blue light LB, the optical system 12 includes three liquid crystal panels of a liquid crystal panel 124R, a liquid crystal panel 124G, and a liquid crystal panel 124B. In this manner, suffixes R, G, and B are used when constituent elements are distinguished from each other for each color component, and the constituent elements are simply denoted by the liquid crystal panel 124 when they are not distinguished from each other. The same is true of constituent elements other than the liquid crystal panel 124.

The dichroic mirror 1231 separates illumination light WL which is output from the light source 122 into red light LR, and non-red light (green light LG and blue light LB). The dichroic mirror 1231 transmits the red light LR, and reflects the green light LG and the blue light LB. The dichroic mirror 1232 separates the light reflected from the dichroic mirror 1231 into the green light LG and the blue light LB. The dichroic mirror 1232 reflects the green light LG, and transmits the blue light LB.

The reflection mirror 1233 is disposed in the optical path of the red light LR. The reflection mirror 1233 reflects the red light LR having passed through the dichroic mirror 1231, and guides the red light to the liquid crystal panel 124R. The reflection mirror 1233 and the reflection mirror 1235 are disposed in the optical path of the blue light LB. The reflection mirror 1233 and the reflection mirror 1235 reflect the blue light LB having passed through the dichroic mirror 1232, and guide the blue light to the liquid crystal panel 124B. The green light LG is reflected from the dichroic mirror 1232, and is guided to the liquid crystal panel 124G.

The relay lens 1236 and the relay lens 1237 are disposed on the output side of the dichroic mirror 1232 in the optical path of the blue light LB. The relay lens 1236 and the relay lens 1237 compensate for an optical loss of the blue light LB which is attributable to the optical path length of the blue light LB being larger than the optical path length of the red light LR or the green light LG.

The liquid crystal panel 124R, the liquid crystal panel 124G, and the liquid crystal panel 124B modulate the red light LR, the green light LG, and the blue light LB, respectively, in accordance with the video signal. As the liquid crystal panel 124R, the liquid crystal panel 124G, and the liquid crystal panel 124B, for example, a light-transmissive liquid crystal panel is used. A field lens 1238 for collimating incident light is provided on the incident side of the liquid crystal panel 124. The beams of light modulated by the liquid crystal panel 124R, the liquid crystal panel 124G, and the liquid crystal panel 124B are synthesized by a cross dichroic prism 1239.

The projection optical system 125 includes at least one projection lens, and may further include a mirror and a prism. The projection optical system 125 projects the light synthesized by the cross dichroic prism 1239 onto the screen SC.

In this example, the optical sensor 16 includes an R sensor 161 and a B sensor 162. The R sensor 161 is a sensor that measures the illuminance of the red light LR. The B sensor 162 is a sensor that measures the illuminance of the blue light LB. In this example, the R sensor 161 is provided at the rear of the reflection mirror 1233. The rear of the reflection mirror 1233 refers to the reverse side of a surface on which the red light LR is incident in the reflection mirror 1233. The reflection mirror 1233 transmits the red light LR at a predetermined ratio. The R sensor 161 measures this transmitted light. The B sensor 162 is provided at the rear of the reflection mirror 1235. The reflection mirror 1235 transmits the blue light LB at a predetermined ratio. The B sensor 162 measures this transmitted light.

Figure 3:
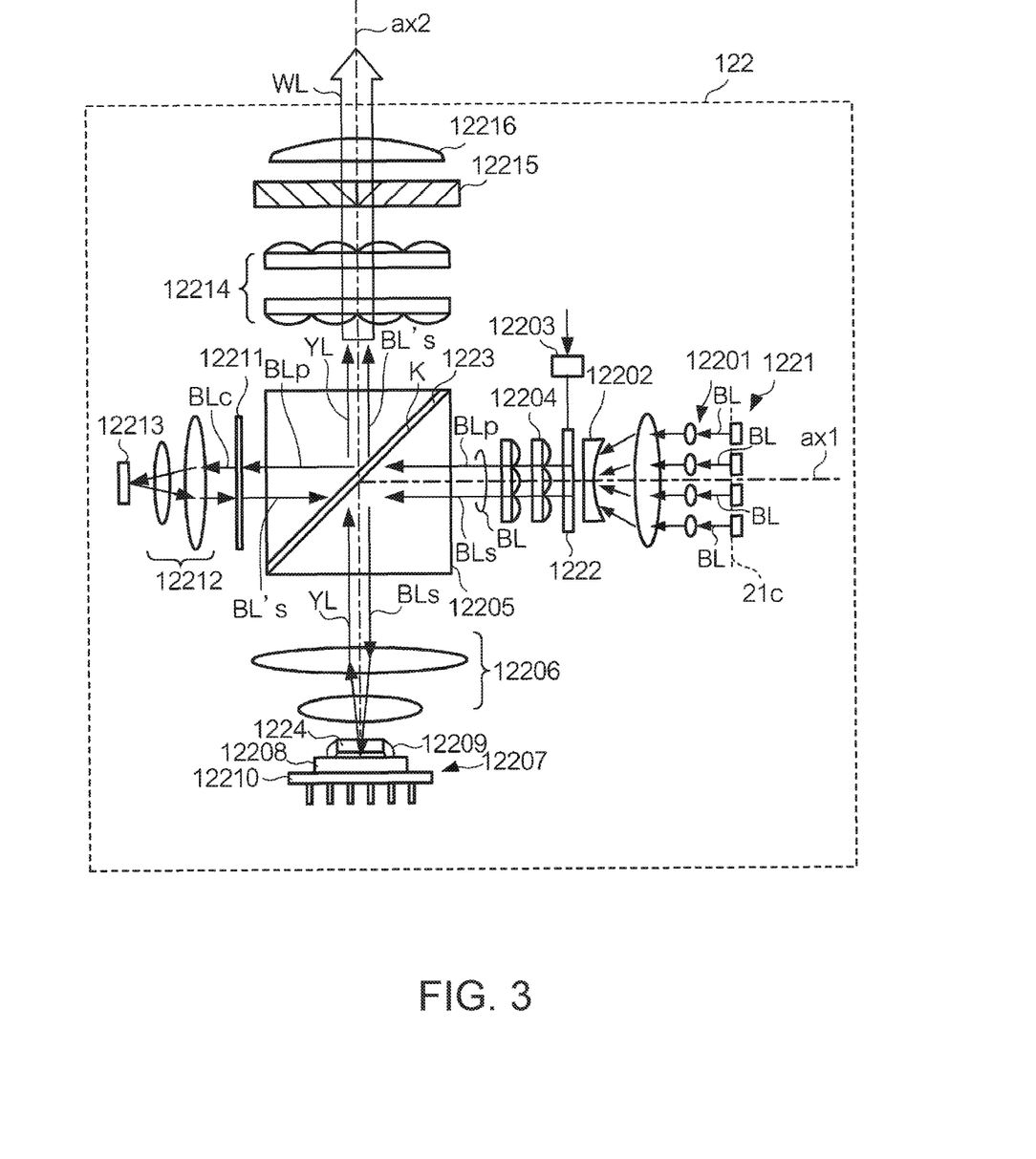
FIG. 3 is a diagram illustrating a configuration of a light source.

FIG. 3 is a diagram illustrating a configuration of the light source 122. Here, the principle of the light source 122 will be first described before its detailed structure. The light source 122 includes a laser diode (LD) array 1221, a retardation plate 1222, a polarization separation element 1223, and a phosphor 1224. The LD array 1221 is an example of a light-emitting element that outputs light of a specific wavelength band (for example, light of a wavelength band equivalent to blue having a peak wavelength of 446 nm; hereinafter, referred to as "B light"), and includes a plurality of laser diodes disposed in an array, in this example. The light which is output from the LD array 1221 is S-polarized light (an example of a first polarization state). The retardation plate 1222 is an example of a retardation plate that converts a portion of light output from the light-emitting element which is appropriate to a rotation angle into a second polarization state. Specifically, the retardation plate 1222 converts a portion of S-polarized light which is output from the LD array 1221 into P-polarized light (an example of the second polarization state). The ratio of conversion into the P-polarized light out of the light which is output from the LD array 1221 (that is, ratio of the S-polarized light to the P-polarized light) changes depending on the angle of the retardation plate 1222 with respect to incident light. The angle of the LD array 1221 with respect to incident light (hereinafter, referred to as the "rotation angle") is controlled by a motor 12203. In the meaning that the rotation angle is made variable by the motor 12203, the retardation plate 1222 is referred to as rotating retardation plate.

The polarization separation element 1223 separates the light which is output from the retardation plate 1222 into two fluxes of light in accordance with a polarization state. The polarization separation element 1223 is an example of a polarization separation element that separates the light from the retardation plate into a first flux of light of the first polarization state and a second flux of light of the second polarization state. In this example, the polarization separation element 1223 reflects the S-polarized light, and transmits the P-polarized light. The light (an example of a first flux of light) reflected by the polarization separation element 1223 is incident on the phosphor 1224. The phosphor 1224 is excited by light of a first wavelength band, and outputs light (an example of a third flux of light; hereinafter, referred to as "Y light") of a second wavelength band (for example, wavelength band equivalent to yellow) different from the first wavelength band. The B light (an example of the second flux of light) having passed through the polarization separation element 1223 is finally synthesized with the Y light having output from the phosphor 1224, and is output to the outside of the light source 122, as white light including components of a plurality of wavelength bands.

As can be seen from the above description, the S-polarized light out of the light which is output from the LD array 1221 is converted into the Y light, the P-polarized light remains the B light, and both are finally synthesized. A change in the ratio of the S-polarized light to the P-polarized light due to the rotation angle of the retardation plate 1222 refers to a change in the ratio of the Y light to the B light due to the rotation angle of the retardation plate 1222. That is, in the light source 122, a balance between the Y light and the B light (hereinafter, referred to as a "color balance") can be adjusted.

Hereinafter, the specific configuration example of the light source 122 will be described. The B light which is output from the LD array 1221 is incident on a collimator optical system 12201. The collimator optical system 12201 converts the B light which is output from the LD array 1221 into a parallel flux of light. The collimator optical system 12201 is constituted by, for example, a plurality of collimator lenses disposed side by side in an array. The plurality of collimator lenses are disposed corresponding to a plurality of laser diodes.

The B light which is output from the collimator optical system 12201 is incident on an afocal optical system 12202. The afocal optical system 12202 adjusts the light flux diameter of the B light. In this example, the afocal optical system 12202 is constituted by, for example, two afocal lenses.

The B light which is output from the afocal optical system 12202 is incident on the retardation plate 1222. The retardation plate 1222 is constituted by a ½-wavelength plate for the B light (wavelength of 446 nm in this example). The optical axis of the retardation plate 1222 intersects the polarization axis of the B light which is incident on the retardation plate 1222. The optical axis of the retardation plate 1222 may be either the phase advance axis or the phase lag axis of the retardation plate 1222. The B light which is incident on the retardation plate 1222 is coherent S-polarized light. The B light having passed through the retardation plate 1222 serves as light having an S polarization component BLs and a P polarization component BLp mixed with each other at a predetermined ratio. The motor 12203 for rotating the retardation plate 1222 is connected to the retardation plate 1222. The motor 12203 is, for example, a stepping motor.

The B light which is output from the retardation plate 1222 is incident on a homogenizer optical system 12204. The homogenizer optical system 12204 converts the light intensity distribution of the B light into uniform light intensity distribution called, for example, top hat-type distribution. In this example, the homogenizer optical system 12204 is constituted by two multi-lens arrays.

The B light which is output from the homogenizer optical system 12204 is incident on a prism 12205. The prism 12205 is constituted by, for example, a dichroic prism having wavelength selectivity. The dichroic prism has an inclined surface K at an angle of 45° to an optical axis ax1. The inclined surface K is at an angle of 45° to an optical axis ax2.

The prism 12205 is disposed so that the point of intersection between the optical axis ax1 and the optical axis ax2 orthogonal to each other and the optical center of the inclined surface K are coincident with each other. A parallel plate-like dichroic mirror may be used instead of the prism 12205. The optical axis ax1 and the optical axis ax2 are flush with each other, and have a positional relationship in which these axes are orthogonal to each other.

The polarization separation element 1223 having wavelength selectivity is provided on the inclined surface K. The polarization separation element 1223 separates the B light into the S polarization component BLs and the P polarization component BLp. Specifically, the polarization separation element 1223 reflects the S polarization component BLs, and transmits the P polarization component BLp. The S polarization component BLs reflected by the polarization separation element 1223 is used for the excitation of the phosphor 1224, and thus is hereinafter referred to as excitation light BLs. The P polarization component BLp having passed through the polarization separation element 1223 is simply referred to as the B light.

The excitation light BLs which is output from the polarization separation element 1223 is incident on the pickup optical system 12206. The pickup optical system 12206 condenses the excitation light BLs in the phosphor 1224 of a fluorescent element 12207. The pickup optical system 12206 is constituted by two pickup lenses in this example. The fluorescent element 12207 includes the phosphor 1224 and a substrate 12208. The substrate 12208 supports the phosphor 1224. When the excitation light BLs is incident, the phosphor 1224 is excited, and fluorescent light is output. The fluorescent light is light (referred to as the Y light since this light is light of a wavelength band of yellow in this example) which is different in wavelength from the excitation light BLs. The phosphor 1224 is fixed to the substrate 12208 by an adhesive 12209 provided between the lateral side of the phosphor 1224 and the substrate 12208, in a state where a surface on the opposite side to a side where the excitation light BLs is incident is brought into contact with the substrate 12208. A heat sink 12210 for dissipating heat of the phosphor 1224 is provided on the surface of the substrate 12208 on the opposite side to a side where the phosphor 1224 is provided.

Since the Y light which is output from the phosphor 1224 is non-polarized light of which the polarization direction is not aligned, the light passes through the pickup optical system 12206, and then is incident on the polarization separation element 1223 while remaining in a state of non-polarization. The polarization separation element 1223 transmits fluorescent light different in wavelength band from the B light, regardless of the polarization state of the Y light.

On the other hand, the B light which is output from the polarization separation element 1223 is incident on a retardation plate 12211. The retardation plate 12211 is constituted by, for example, a ¼-wavelength plate. The retardation plate 12211 converts the polarization state of the B light into circular polarization. The B light which is output from the retardation plate 12211 is incident on a pickup optical system 12212. The pickup optical system 12212 condenses the B light in a diffusion and reflection element 12213. The pickup optical system 12212 is constituted by two pickup lenses in this example.

The diffusion and reflection element 12213 diffuses and reflects the B light. As the diffusion and reflection element 12213, it is preferable to use an element that performs Lambertian reflection on incident light. It is possible to obtain the B light having a uniform illuminance distribution by using such a diffusion and reflection element. The B light diffused and reflected by the diffusion and reflection element 12213 is incident on the retardation plate 12211 again, and is converted from circularly polarized light to S-polarized light. The B light which is output from the retardation plate 12211 is reflected from the polarization separation element 1223.

The polarization separation element 1223 outputs the Y light and the B light, as a result, in the same direction. That is, the polarization separation element 1223 also functions as a synthesis element that synthesizes the Y light and the B light. The light which is output from the polarization separation element 1223 is referred to as illumination light.

The illumination light which is output from the polarization separation element 1223 is incident on an integrator optical system 12214. The integrator optical system 12214 divides the illumination light WL into a plurality of small fluxes of light. The integrator optical system 12214 is constituted by two lens arrays in this example. The lens array has a configuration in which a plurality of microlenses are disposed in an array.

The illumination light which is output from the integrator optical system 12214 is incident on the polarization conversion element 12215. The polarization conversion element 12215 is used to align the polarization direction of the illumination light WL. The polarization conversion element 12215 is constituted by, for example, a polarization separation film, a retardation plate, and a mirror. In order to align the polarization direction of the Y light which is non-polarized light and the polarization direction of the B light which is S-polarized light, the polarization conversion element 12215 converts one polarization component into the other polarization component, for example, a P polarization component into an S polarization component. A superposition lens 12216 superposes a plurality of small fluxes of light emitted from the polarization conversion element 12215 on an object to be illuminated.

Reference will be made to FIG. 1 again. The UI unit 13 receives an input of an instruction from a user. Here, particularly, an input of an instruction for setting the brightness of the light source 122 is received. The UI unit 13 outputs brightness information which is set in accordance with a user's instruction input. The optical sensor 16 measures the illuminance of light after separation, in the optical system 12 (particularly, illumination optical system 123). The temperature sensor 17 is a sensor for measuring the temperature of the light source 122, and is provided in the vicinity of the light source 122. The light source information storage unit 15 stores information relating to the input and output characteristics of the light source 122 (hereinafter, referred to as "light source information").

The light source control unit 14 controls the light source 122 (through the light source drive unit 121). More specifically, the light source control unit 14 controls a color balance of the light source 122. The control of the color balance is performed on the basis of the brightness information. The brightness information refers to information for setting the brightness of light which is output from the light source 122, and refers to information directly or indirectly indicating the brightness of light which is output from the light source 122. In this example, the pieces of brightness information are independently provided from the image analysis unit 112, the UI unit 13, and the temperature sensor 17. Although a detailed description will be given later, the light source control unit 14 uses information obtained by integrating the plurality of pieces of brightness information, and controls the color balance of the light source 122. In a case where the pieces of brightness information before and after integration are distinguished from each other, the brightness information before integration is referred to as "individual brightness information", and the brightness information after integration is referred to as "integrated brightness information". The "individual pieces of brightness information" include information supplied from the image analysis unit 112 (referred to as "brightness information (video)"), information supplied from the UI unit 13 (referred to as "brightness information (UI)"), and information supplied from the temperature sensor 17 (referred to as "brightness information (temperature)"). When the pieces of individual brightness information and the pieces of integrated brightness information are not distinguished from each other, these pieces of information are simply referred to as brightness information.

Figure 4:
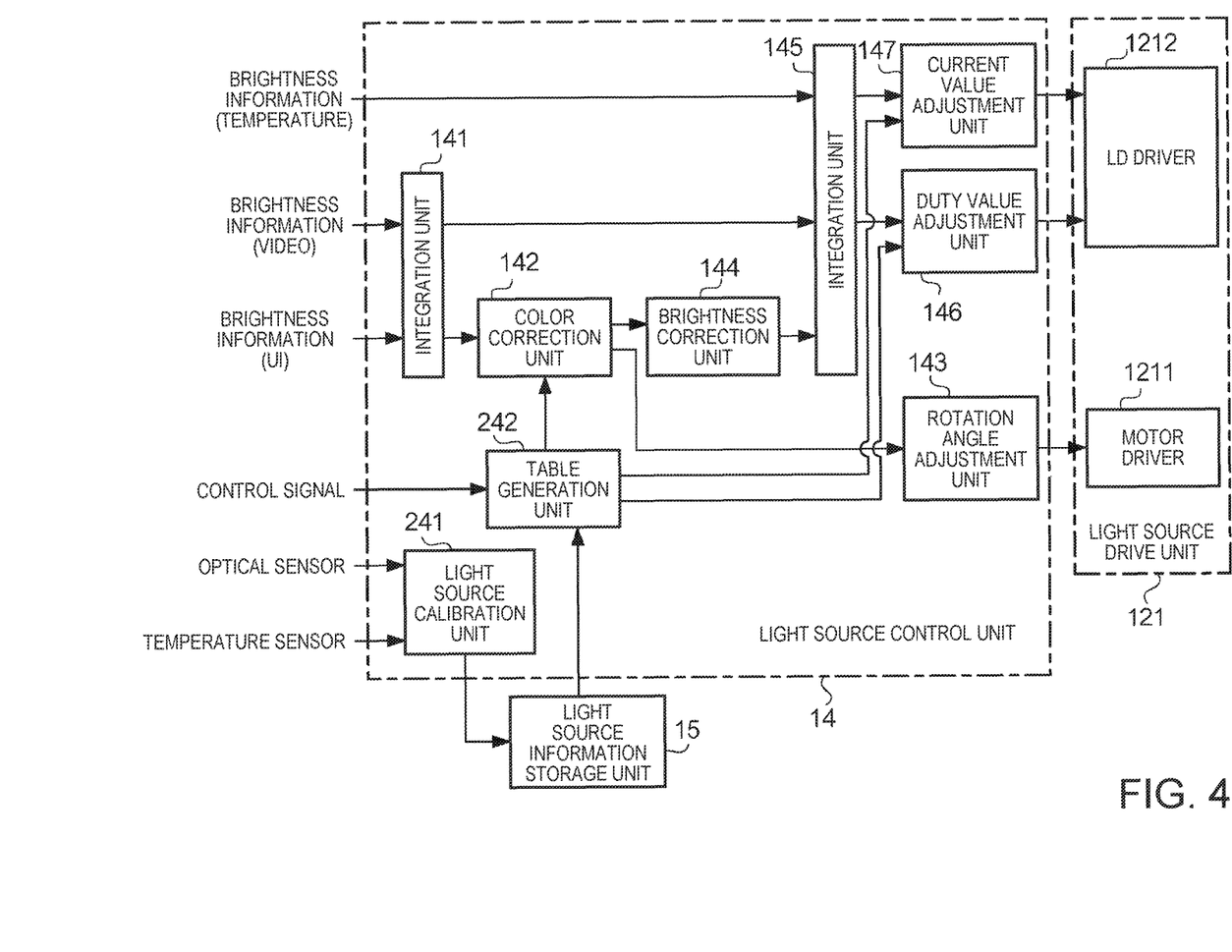
FIG. 4 is a diagram illustrating a functional configuration of a light source control unit according to the first embodiment.

FIG. 4 is a diagram illustrating a functional configuration of the light source control unit 14 according to the embodiment. The light source control unit 14 includes an integration unit 141, a color correction unit 142, a rotation angle adjustment unit 143, a brightness correction unit 144, an integration unit 145, a duty value adjustment unit 146, a current value adjustment unit 147, a light source calibration unit 241, and a table generation unit 242.

The integration unit 141 integrates a plurality of pieces of individual brightness information with each other, and generates integrated brightness information. In this example, particularly, the integration unit 141 integrates the individual brightness information (UI) with other individual brightness information, for example, the individual brightness information (video). The information which is output from the image analysis unit 112 is, for example, information indicating the type of video, but the integration unit 141 converts the information indicating the type of video into brightness information in accordance with a predetermined rule (for example, a movie is 80%, sports broadcast is 90%, and a presentation image is 100%). That is, the integration unit 141 functions as a setting unit that sets the brightness information on the basis of an output of the image analysis unit 112. As described later, the integration unit 145 also integrates a plurality of pieces of brightness information with each other, and thus the brightness information which is output from the integration unit 141 is herein referred to as first integrated brightness information. When the first integrated brightness information and second integrated brightness information are not distinguished from each other, these pieces of integrated brightness information are simply referred to as integrated brightness information. The first integrated brightness information is used in the color correction unit 142 and the integration unit 145.

The color correction unit 142 performs color correction, that is, adjustment of a color balance on the basis of the first integrated brightness information. The color correction unit 142 stores a table (color correction table) in which brightness and a correction value of the color balance are associated with each other. When the first integrated brightness information is input, the color correction unit 142 refers to this table, and outputs a correction value corresponding to the first integrated brightness information which is input.

The rotation angle adjustment unit 143 converts the correction value of the color balance into the rotation angle of the retardation plate 1222. The rotation angle adjustment unit 143 stores a table (retardation plate table) in which the correction value of the color balance and the rotation angle of the retardation plate 1222 are associated with each other. In this example, the retardation plate 1222 is rotated by the motor 12203 which is a stepping motor, and thus the step value of the motor is stored as information equivalent to the rotation angle of the retardation plate 1222. When the correction value of the color balance is input, the rotation angle adjustment unit 143 outputs a step value corresponding to the input correction value. This step value is input to a motor driver 1211 of the light source drive unit 121. The motor driver 1211 drives the motor 12203 in accordance with a signal supplied from the rotation angle adjustment unit 143. The motor driver 1211 is an example of a retardation plate control unit that controls the rotation angle of the retardation plate 1222 in accordance with the brightness information. In addition, in this example, it may be said that the rotation angle adjustment unit 143 uses the output of the color correction unit 142 as an input, to thereby control the rotation angle of the retardation plate 1222 in accordance with a correction result in the color correction unit 142. Further, since the brightness information (video) is input to the integration unit 141, it may be said that the motor driver 1211 controls the rotation angle of the retardation plate 1222 in accordance with the brightness information (video).

The brightness correction unit 144 corrects the brightness of the light source 122 in accordance with the correction value of the color balance, that is, the correction result in the color correction unit 142. The brightness correction unit 144 stores a table (brightness correction table) in which the correction value of the color balance and the correction value of the brightness are associated with each other. When the correction value of the color balance is input, the brightness correction unit 144 outputs a correction value of brightness corresponding to the input correction value. The correction value of the brightness is input to the integration unit 145.

The integration unit 145 integrates a plurality of pieces of brightness information with each other, and generates integrated brightness information. In this example, particularly, the integration unit 145 integrates the individual brightness information (temperature) with the first integrated brightness information. At the time of integration, the integration unit 145 corrects the brightness information in accordance with the correction value of the brightness which is input from the brightness correction unit 144. The information which is output from the temperature sensor 17 is information indicating the temperature of the light source 122 (hereinafter, referred to as "temperature information"), but the integration unit 145 converts the temperature information into the brightness information in accordance with a predetermined rule. That is, the integration unit 145 functions as a setting unit that sets the brightness information on the basis of the output of the temperature sensor 17. The brightness information which is output from the integration unit 145 is herein referred to as second integrated brightness information. The second integrated brightness information is used in the duty value adjustment unit 146 and the current value adjustment unit 147.

The duty value adjustment unit 146 adjusts a duty value on the basis of the second integrated brightness information. The duty value refers to a duty value (duty ratio) in pulse width modulation (PWM) control. The duty value adjustment unit 146 stores a table (duty value table) in which the brightness and the duty value are associated with each other. When the second integrated brightness information is input, the duty value adjustment unit 146 refers to this table, and outputs a duty value corresponding to the second integrated brightness information which is input.

The current value adjustment unit 147 adjusts a current value on the basis of the second integrated brightness information. The current value adjustment unit 147 stores a table (current value table) in which the brightness and the current value are associated with each other. When the second integrated brightness information is input, the current value adjustment unit 147 refers to this table, and outputs a current value corresponding to the second integrated brightness information which is input. The duty value and current value are input to an LD driver 1212 of the light source drive unit 121. The LD driver 1212 drives the LD array 1221 in accordance with signals supplied from the duty value adjustment unit 146 and the current value adjustment unit 147. The LD driver 1212 is an example of a light-emitting element control unit that controls the brightness of the LD array 1221 in accordance with the brightness information and the temperature information indicating the temperature of the LD array 1221. In addition, since the correction value which is output from the brightness correction unit 144 is input to the integration unit 145, it may be said that the LD driver 1212 controls the brightness of the LD array 1221 in accordance with the brightness information corrected in the brightness correction unit 144 and the temperature information.

The light source calibration unit 241 acquires information relating to the input and output characteristics of the light source 122 (hereinafter, referred to as "light source information"). The input and output characteristics indicate how the brightness of the illumination light which is output from the light source 122 changes with respect to the current value to be supplied. The light source calibration unit 241 acquires the light source information from output signals of the optical sensor 16 and the temperature sensor 17. The light source calibration unit 241 stores the acquired light source information in the light source information storage unit 15. The table generation unit 242 uses the light source information stored in the light source information storage unit 15, to update (rewrite) the tables stored in the color correction unit 142, the duty value adjustment unit 146, and the current value adjustment unit 147.

The functions of the UI unit 13, the light source control unit 14, and the image analysis unit 112 among the constituent elements of FIGS. 1 and 4 are provided in, for example, a central processing unit (CPU). Alternatively, these functions may be provided in a dedicated processor. In addition, the function of the light source information storage unit 15 is provided in a rewritable non-volatile memory (for example, flash memory).

2. Operation 2-1. Update of Color Correction Table

Figure 5:
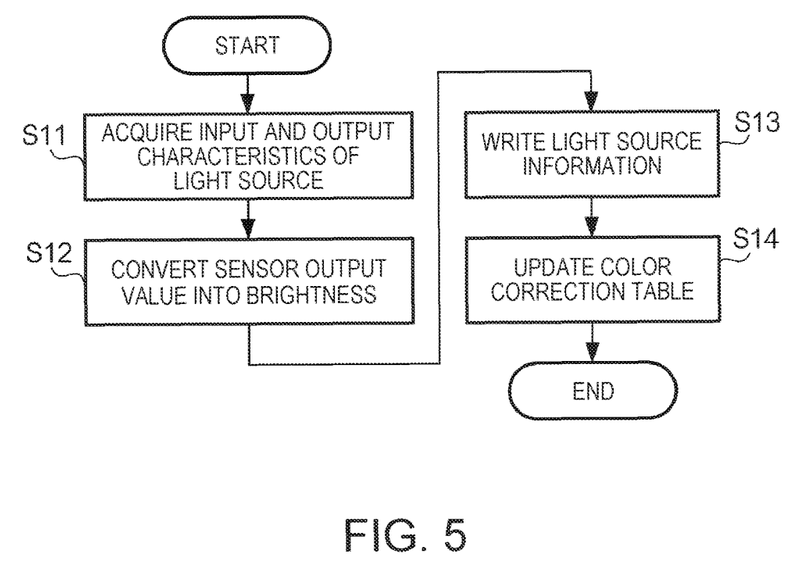
FIG. 5 is a flow diagram illustrating an update process of a color correction table.

FIG. 5 is a flow diagram illustrating an update process of the color correction table. The update process of the color correction table is started at a predetermined timing, for example, at the time of power-off after a time elapsed after the color correction table has previously been updated exceeds a threshold. Alternatively, the update process of the color correction table may be started by a user's instruction.

In step S11, the light source calibration unit 241 acquires the input and output characteristics of the light source. The input and output characteristics of the light source refer to, for example, information indicating a change in the output value of the optical sensor 16 with respect to the current value to be supplied to the LD array 1221. The current to be supplied to the LD array 1221 is referred to as a "drive current", and the value of the drive current is referred to as a "drive current value". The light source calibration unit 241 controls the light source drive unit 121, and sequentially changes the drive current value. The light source calibration unit 241 records a sensor output value from the optical sensor 16 in each drive current value.

Figure 6:
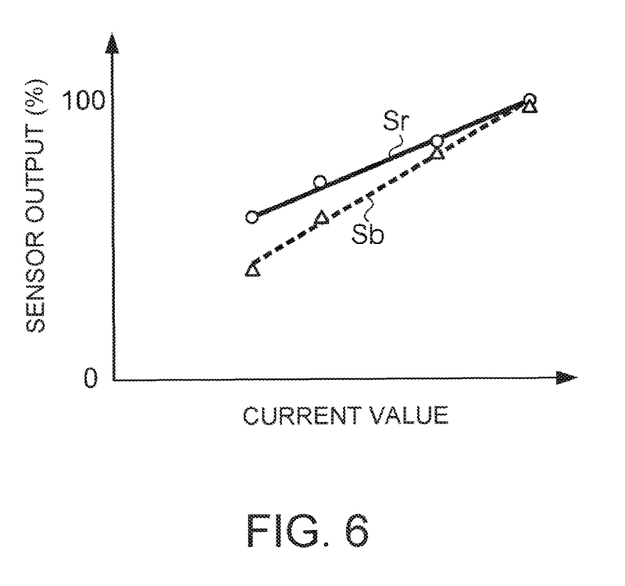
FIG. 6 is a diagram illustrating the input and output characteristics of a light source.

FIG. 6 is a diagram illustrating the input and output characteristics of the light source. In this drawing, the horizontal axis represents a drive current value, and the vertical axis represents a sensor output value. The sensor output value is indicated by a relative value standardized based on a reference value. An example of the reference value to be used includes a maximum value of the sensor output value (sensor output value during a maximum drive current) in input and output characteristics newly measured in this time. The reference value (that is, reference value of the color balance) of a ratio between maximum output values (absolute values rather than relative values) of the R sensor 161 and the B sensor 162 is stored in the light source information storage unit 15, and one of the sensor output values of the R sensor 161 and the B sensor 162 is further standardized in accordance with this reference value. For example, in the following conditions:

R sensor maximum output value=5.0
B sensor maximum output value=3.6
R sensor maximum output value: B sensor maximum output value=5:4
standardization is made as follows:
R sensor maximum output value=100%
B sensor maximum output value=90%.

An example of the reference value of the color balance to be used includes an initial value measured at the time of the factory shipment or a design value determined on design. Alternatively, a value obtained by multiplying the initial value or the design value by a coefficient depending on color modes may be used as the reference value of the color balance. The color mode refers to one of parameters for setting the color balance in the projector 1. For example, the color modes are distinguished from each other in accordance with the viewing environment (brightness or darkness of a room) or the type of video (movie or television program), and a suitable color balance is set in advance for each color mode.

In FIG. 6, an output value Sr indicates an output value of the R sensor 161, and an output value Sb indicates an output value of the B sensor 162. In the example of this drawing, plots in the graph are measurement points, and the straight line indicates a regression line. Even in a case where the LD array 1221 is supplied with the same drive current, the illuminances of light to be output are not the same as each other, and change due to a deterioration in an element associated with the temperature or use. Specifically, due to a rise in a threshold current (lower limit of a current capable of laser oscillation) attendant on the deterioration, illuminance after change over time becomes lower as the current becomes lower. On the other hand, the phosphor 1224 has the characteristics of a change in conversion efficiency due to the intensity of excitation light, for example, the characteristics of an increase in conversion efficiency as the brightness of the excitation light becomes lower. For this reason, in a case where the illuminance of laser light to be output when the LD array 1221 is supplied with a certain drive current becomes lower, the Y light tends to become relatively more intensive than the B light. In addition, in the phosphor 1224, even in a case where excitation light of the same illuminance is incident, the illuminance of fluorescent light to be output may change due to a deterioration in an element attendant on the temperature or use.

Reference will be made to FIG. 5 again. In step S12, the light source calibration unit 241 converts the sensor output value into brightness. The conversion from the sensor output value to brightness is performed, for example, by inputting both the output value of the R sensor 161 and the output value of the B sensor 162 into a predetermined relational expression. Alternatively, in a simple manner, the output value of the R sensor 161 may be replaced with brightness. In addition, a value obtained by perform a predetermined correction process on the output value of the R sensor 161 may be set to brightness. The R sensor 161 indirectly measures the illuminance of the Y light, but this is because contribution to brightness is larger in the Y light than in the B light, in terms of human vision.

In step S13, the light source calibration unit 241 writes the light source information in the light source information storage unit 15. The light source information to be written herein is information indicating a change in brightness with respect to the drive current value. In this manner, the light source information is updated at any time, and thus it is possible to perform correction according to the input and output characteristics of the LD array 1221 at the point in time.

Figure 7:
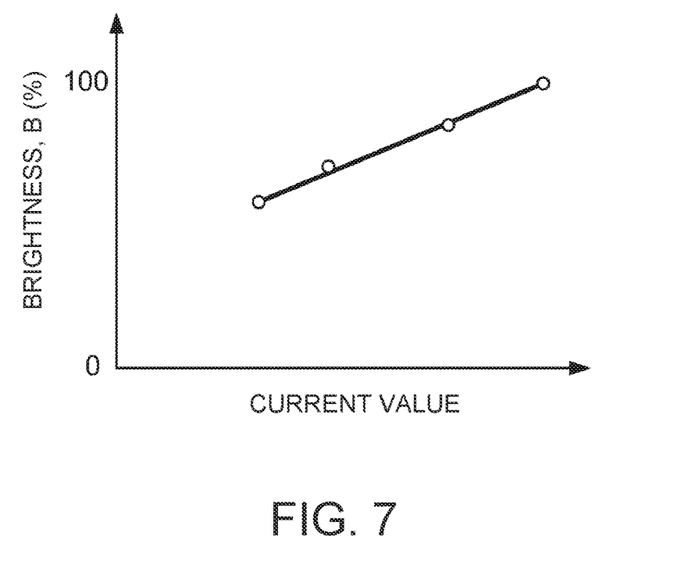
FIG. 7 is a diagram illustrating light source information.

FIG. 7 is a diagram illustrating the light source information. In this example, the output value of the R sensor 161 is used as brightness, and the shape of a graph is the same as that of the output value Sr in FIG. 6. The light source information to be written may be a set of coordinates of points equivalent to measurement points, and may be information (for example, inclination and intercept) for specifying a regression line. In addition, approximate curves other than the regression line may be used.

Reference will be made to FIG. 5 again. When an instruction for generating the color correction table is given by a control signal, the table generation unit 242 generates (updates) the color correction table (step S14). The details are as follows. The table generation unit 242 uses information stored in the light source information storage unit 15, to calculate a correction value C of the color balance in accordance with the following Expression (1).

$$C(B)=Rs(B)/Rm(B)$$

$$(Rm(B)=Sb(B)/Sr(B)) \quad (1)$$

C(B) indicates a correction value when brightness is B, Rs(B) indicates a target value of the color balance when brightness is B, Rm(B) indicates a color balance based on real measurement when brightness is B, Sb(B) indicates an output value of the B sensor 162 when brightness is B, and Sr(B) indicates an output value of the R sensor 161 when brightness is B. As obvious from such a definition, the correction value C becomes smaller as the illuminance of the B light becomes higher than that of the Y light. The correction value C is calculated by Expression (1) with respect to a plurality of brightnesses B, and thus a relationship between the correction value C and the brightness B is obtained.

Figure 8:
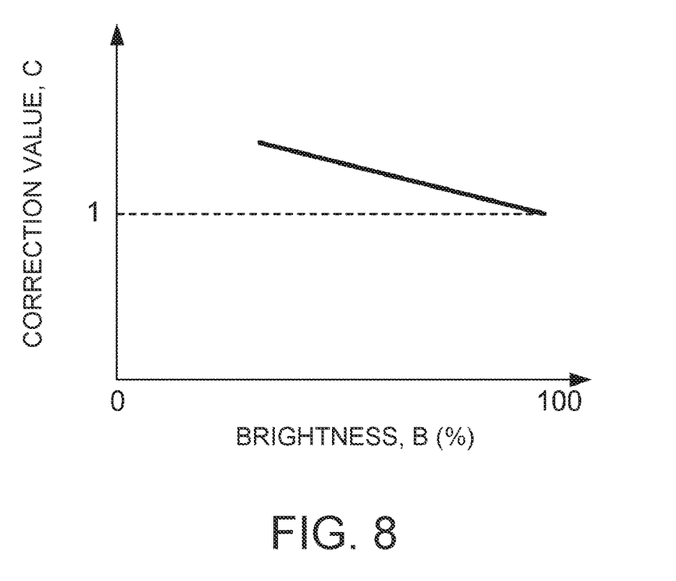
FIG. 8 is a diagram illustrating a relationship between a correction value and brightness.

FIG. 8 is a diagram illustrating a relationship between the correction value C and the brightness B. In this drawing, the horizontal axis represents brightness, and the vertical axis represents the correction value C of the color balance. The table generation unit 242 updates the color correction table by writing data, obtained by tabling the relationship between the correction value C and the brightness B, in the color correction unit 142.

According to the present embodiment, the color correction table is updated at any time in accordance with the state of the light source 122 (specifically, LD array 1221 and phosphor 1224). Although a detailed description will not be given, the table generation unit 242 updates the duty value table and the current value table similarly on the basis of the light source information.

Figure 9:
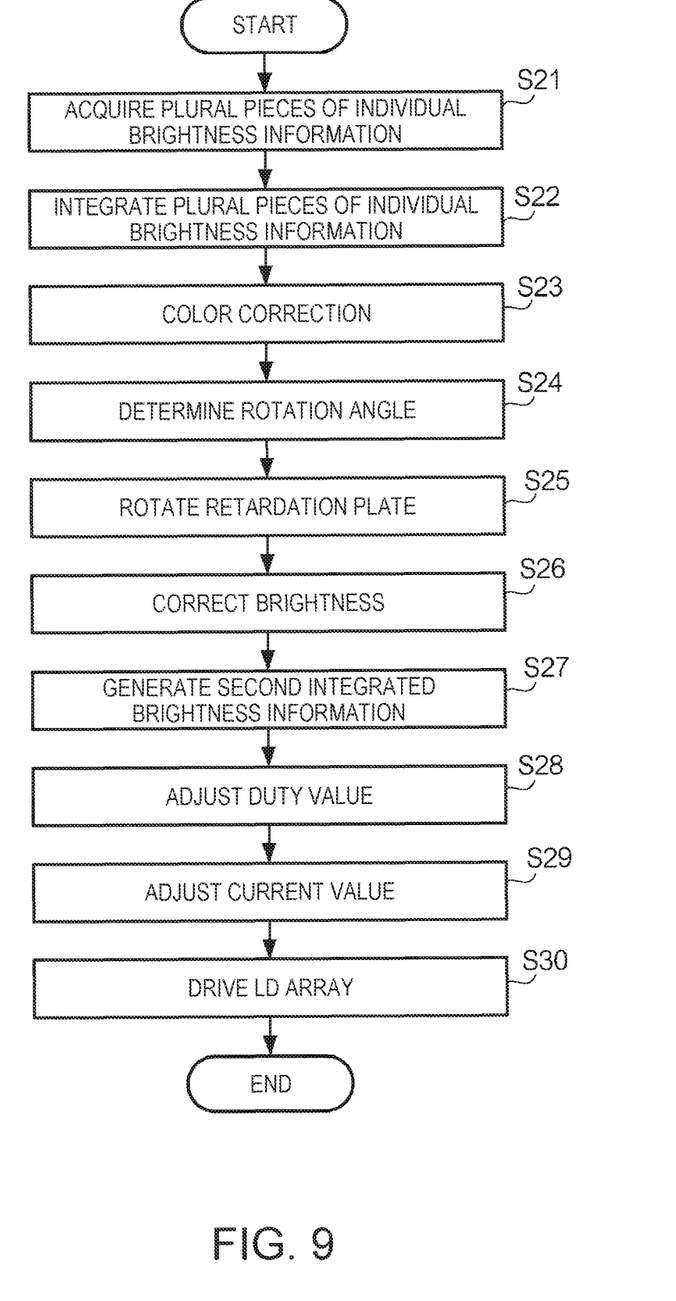
FIG. 9 is a flow diagram of a rotation angle control process of a retardation plate.

2-2. Rotation Angle Control of Retardation Plate and Brightness Control of Light Source FIG. 9 is a flow diagram illustrating a process of rotation angle control of the retardation plate and brightness control of the light source. This process is executed at a predetermined timing, for example, every time pieces of individual brightness information are updated, or for each frame of video indicated by a video signal. Alternatively, the rotation angle control process of the retardation plate may be started by a user's instruction.

In step S21, the integration unit 141 acquires the pieces of individual brightness information. In this example, the integration unit 141 acquires the brightness information (video) and the brightness information (UI).

In step S22, the integration unit 141 integrates these two pieces of individual brightness information with each other, and generates first integrated brightness information. In this example, both the brightness information (video) and the brightness information (UI) are indicated by percentage, and the first integrated brightness information is generated by multiplying these two pieces of brightness information together. A method of obtaining the integrated brightness information from the pieces of individual brightness information is not limited thereto, and the integrated brightness information may be generated, for example, by performing weighted multiplication or weighted addition on the pieces of individual brightness information.

When the first integrated brightness information is input from the integration unit 141, the color correction unit 142 performs color correction (step S23). Specifically, the color correction unit 142 refers to the stored color correction table (FIG. 8), and outputs a correction value C of the color correction corresponding to the integrated brightness information which is input. The correction value C is used in the rotation angle adjustment unit 143 and the brightness correction unit 144. When the correction value C is input from the color correction unit 142, the rotation angle adjustment unit 143 determines a rotation angle (step S24).

Figure 10:
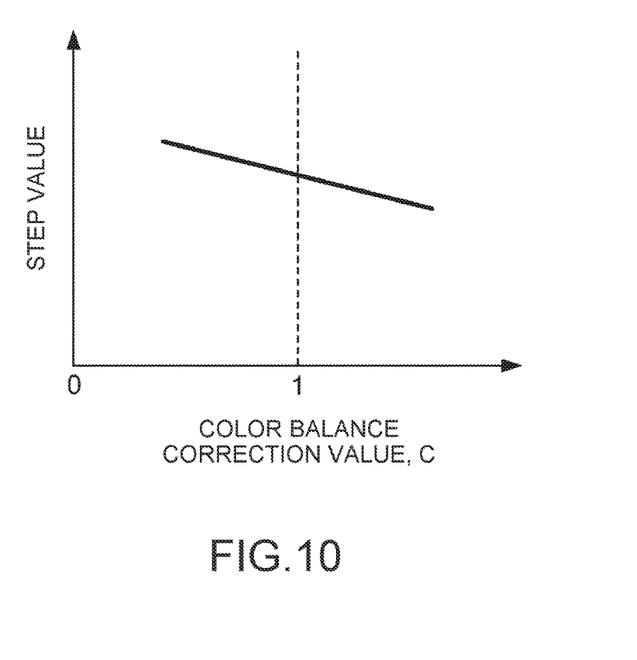
FIG. 10 is a diagram illustrating information indicated by a retardation plate table.

FIG. 10 is a diagram illustrating information indicated by the retardation plate table. In this drawing, the horizontal axis represents a correction value C, and the vertical axis represents a step value of the motor 12203. The rotation angle adjustment unit 143 refers to this retardation plate table, and reads out a step value corresponding to the correction value C. The rotation angle adjustment unit 143 outputs this step value to the motor driver 1211. When the step value is input, the motor driver 1211 controls the motor 12203 in accordance with the input step value. That is, the rotation angle of the retardation plate 1222 is adjusted to a desired value (step S25).

In order to adjust the color balance in accordance with brightness settings, it is also considered, for example, to prepare a retardation plate table in advance for each brightness setting, and to adjust the rotation angle of the retardation plate 1222 with reference to a corresponding retardation plate table in accordance with the brightness settings. However, in such a method, the projector 1 is required to hold a large amount of data, which leads to complicated results. According to the present embodiment, it is possible to adjust the color balance in accordance with the brightness information. That is, it is possible to adjust the color balance in accordance with each of a plurality of brightness settings. In addition, in the present embodiment, since the color balance is adjusted in accordance with the light source information of the light source 122 changing at any time, it is possible to cope with even a change in the light source 122 over time.

Reference will be made to FIG. 9 again. When the correction value C is input from the color correction unit 142, the brightness correction unit 144 refers to the brightness correction table, and corrects the brightness of the light source 122 (step S26).

Figure 11:
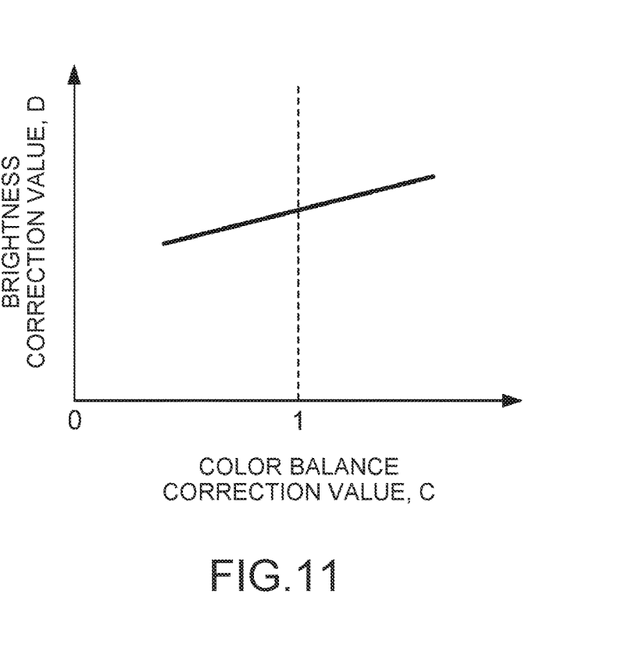
FIG. 11 is a diagram illustrating information indicated by a brightness correction table.

FIG. 11 is a diagram illustrating information indicated by the brightness correction table. In this drawing, the horizontal axis represents a correction value C of the color balance, and the vertical axis represents a correction value D of brightness. In this example, the brightness correction value D becomes larger as the correction value C of the color balance becomes larger (as the illuminance of the B light becomes lower than that of the Y light). The brightness correction unit 144 refers to this brightness correction table, and reads out a correction value D of brightness corresponding to the correction value C of the color balance. The brightness correction unit 144 outputs this correction value D to the integration unit 145.

Reference will be made to FIG. 9 again. In step S27, the integration unit 145 integrates the individual brightness information (temperature) with the first integrated brightness information, and generates the second integrated brightness information. When the second integrated brightness information is generated, the integration unit 145 considers the correction value D which is input from the brightness correction unit 144. Both the individual brightness information (temperature) and the correction value D are indicated by percentage, and the integration unit 145 generates the second integrated brightness information, specifically, by multiplying the individual brightness information (temperature), the first integrated brightness information, and the correction value D together. A method of obtaining the second integrated brightness information is not limited thereto, and the second integrated brightness information may be generated, for example, by performing weighted multiplication or weighted addition on various types of brightness information. The second integrated brightness information is used in the duty value adjustment unit 146 and the current value adjustment unit 147.

When the second integrated brightness information is input from the integration unit 145, the duty value adjustment unit 146 adjusts the duty value (step S28). The duty value adjustment unit 146 stores a table (hereinafter, referred to as a "duty value table") in which the brightness of the light source 122 and the duty value are associated with each other (not shown). The duty value adjustment unit 146 refers to this duty value table, and reads out a duty value corresponding to the second integrated brightness information. The duty value adjustment unit 146 outputs this duty value to the LD driver 1212.

When the second integrated brightness information is input from the integration unit 145, the current value adjustment unit 147 adjusts the drive current value (step S29). The current value adjustment unit 147 stores a table (hereinafter, referred to as a "current value table") in which the brightness of the light source 122 and the drive current value are associated with each other (not shown). The current value adjustment unit 147 refers to this current value table, and reads out a current value corresponding to the second integrated brightness information. The current value adjustment unit 147 outputs this current value to the LD driver 1212.

The LD driver 1212 drives the LD array 1221 in accordance with the input duty value and current value (step S30). That is, the illuminance of light which is output from the LD array 1221 is adjusted.

For example, when the amount of excitation light of the phosphor 1224 changes, the balance (color balance) between the Y light and the B light changes due to the influence of the phosphor on conversion efficiency. In this case, in a case where a user adjusts brightness intentionally (in a case where the brightness information (UI) changes), the retardation plate 1222 is rotated in accordance with a brightness setting value, and the color balance is maintained. On the other hand, in a case where an output fluctuates due to the temperature characteristics of the LD array 1221, brightness is adjusted so as to reach purpose brightness, but it is preferable that the rotation angle of the retardation plate 1222 is not changed in order to maintain the color balance. According to the present embodiment, the brightness information (specifically, brightness information (UI) and brightness information (video)) used to adjust the color balance and the brightness information (specifically, brightness information (temperature)) used to adjust the brightness of the light source 122 are distinguished from each other. Therefore, according to the present embodiment, it is possible to properly use the presence or absence of control of the color balance in accordance with the situation.

In the present embodiment, first, the rotation angle of the retardation plate 1222 is determined in accordance with the first integrated brightness information, that is, the color balance is adjusted. Subsequently, the brightness of the LD array 1221 is adjusted in accordance with the second integrated brightness information on which the adjustment result of the color balance is reflected. Therefore, it is possible to adjust the brightness of the LD array 1221 in accordance with the adjustment result of the color balance.

3. Modification Example

The invention is not limited to the above-described embodiment, and can be variously modified. Hereinafter, some modification examples will be described. Two or more modification examples among the following ones may be used in combination therewith.

The brightness information (video) may not be used for the adjustment of the color balance, that is, the color correction. That is, the brightness information (video) may be input to the integration unit 145 rather than the integration unit 141. In this case, the integration unit 141 is not required, and the brightness information (UI) is input to the color correction unit 142. In this case, it may be said that the LD driver 1212 controls the brightness of the LD array 1221 in accordance with the brightness information (video) and the temperature information. According to this example, the adjustment of the color balance can be limited to only when a user intentionally gives an instruction for the adjustment of brightness.

Update of various types of tables according to the input and output characteristics of the light source 122 may be omitted. That is, the light source control unit 14 may not include the light source calibration unit 241 and the table generation unit 242.

Pieces of brightness information which are input to the integration unit 141 and the integration unit 145 are not limited to those illustrated in the embodiment. For example, the brightness information (temperature) and the brightness information (video) may be input to the integration unit 141, and the brightness information (UI), the first integrated brightness information, and the correction value of brightness may be input to the integration unit 145.

The brightness information (temperature) is not limited to those obtained from the output value of the temperature sensor 17. Insofar as information relating to the temperature of the light source 122 is used, any kind of information may be used. For example, since the temperature of the light source 122 is considered to be low immediately after the startup of the projector 1, a time elapsed after the projector 1 has been powered-on may be used as the brightness information (temperature). In this case, the temperature sensor 17 is not required.

Pieces of brightness information to be considered are not limited to those illustrated in the embodiment. For example, at least one of the brightness information (video), the brightness information (UI), and the brightness information (temperature) may be omitted. Alternatively, pieces of brightness information other than these three may be used.

The disposition of the R sensor 161 and the B sensor 162 is not limited to one illustrated in FIG. 2. For example, an optical element that branches light may be disposed on the optical path of the red light LR, and the R sensor 161 may be disposed at a position on which the branched light is incident. The same is true of the B sensor 162.

The specific hardware configuration of the projector 1 is not limited to one illustrated in the embodiment. For example, as an optical modulator, a reflection-type liquid crystal panel or a digital miller device (DMD) may be used instead of a light-transmissive liquid crystal panel.

The wavelength or polarization state of light used in the light source 122 is merely illustrative, and the invention is not limited thereto.

What is claimed is:

1. A projector comprising:
   a light-emitting element that outputs light of a first wavelength band which is in a first polarization state;
   a retardation plate that converts a portion of the light output from the light-emitting element into a second polarization state in accordance with a rotation angle of the retardation plate;
   a polarization separation element that separates the light from the retardation plate into a first flux of light in the first polarization state and a second flux of light in a second polarization state;
   a phosphor, excited by the first flux of light, which outputs a third flux of light of a second wavelength band different from the first wavelength band;
   an optical modulator that modulates the light in accordance with a video signal;
   a retardation plate control unit that controls a rotation angle of the retardation plate in accordance with brightness information indicating brightness of the third flux of light; and
   a light-emitting element control unit that controls brightness of the light-emitting element in accordance with the brightness information and temperature information indicating a temperature of the light-emitting element.

2. The projector according to claim 1, further comprising a color correction unit that performs color correction in accordance with the brightness information,
   wherein the retardation plate control unit controls the rotation angle of the retardation plate in accordance with a correction result in the color correction unit.

3. The projector according to claim 2, further comprising a brightness correction unit that corrects the brightness information in accordance with the correction result in the color correction unit,
   wherein the light-emitting element control unit controls the brightness of the light-emitting element in accordance with the brightness information corrected in the brightness correction unit and the temperature information.

4. The projector according to claim 1, wherein the brightness information includes brightness information which is set in accordance with a user's instruction input.

5. The projector according to claim 1, wherein the light-emitting element control unit controls the brightness of the light-emitting element in accordance with the brightness information which is set depending on an analysis result of the video signal and the temperature information.

6. The projector according to claim 1, wherein the retardation plate control unit controls the rotation angle of the retardation plate in accordance with the brightness information which is set depending on an analysis result of the video signal.

7. A control method comprising:
   causing a light-emitting element to output light of a first wavelength band which is in a first polarization state;
   causing a retardation plate to convert a portion of the light output from the light-emitting element into a second polarization state in accordance with a rotation angle of the retardation plate;
   separating the light from the retardation plate into a first flux of light in the first polarization state and a second flux of light in a second polarization state;
   causing a phosphor excited by the first flux of light to output a third flux of light of a second wavelength band different from the first wavelength band;
   causing an optical modulator to modulate the light in accordance with a video signal;
   controlling a rotation angle of the retardation plate in accordance with brightness information indicating brightness of the third flux of light; and
   controlling brightness of the light-emitting element in accordance with the brightness information and temperature information indicating a temperature of the light-emitting element.

* * * * *